(12) United States Patent
Yu et al.

(10) Patent No.: US 9,413,933 B2
(45) Date of Patent: Aug. 9, 2016

(54) CAMERA MODULE WITH ELECTRO-MAGNETIC INTERFERENCE SHIELDING

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Jun-Hui Yu, Shenzhen (CN); Shin-Wen Chen, New Taipei (TW); Shu-Sheng Peng, Shenzhen (CN); Yong Li, Shenzhen (CN); Dai-Peng Zhu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/672,446

(22) Filed: Mar. 30, 2015

(65) Prior Publication Data
US 2015/0281532 A1 Oct. 1, 2015

(30) Foreign Application Priority Data

Mar. 28, 2014 (CN) .......................... 2014 1 0121561

(51) Int. Cl.
*H04N 5/225* (2006.01)

(52) U.S. Cl.
CPC ........... *H04N 5/2252* (2013.01); *H04N 5/2253* (2013.01); *H04N 5/2254* (2013.01); *H04N 5/2257* (2013.01)

(58) Field of Classification Search
CPC ............................ H04N 5/2252; H04N 5/2257
See application file for complete search history.

(56) References Cited

U.S. PATENT DOCUMENTS

| 8,049,815 | B2 * | 11/2011 | Huang | ................. | G02B 7/021 348/374 |
| 8,866,919 | B2 * | 10/2014 | Ahn | ......................... | G03B 5/00 348/208.7 |
| 9,210,309 | B2 * | 12/2015 | Park | ..................... | H04N 5/2254 |

* cited by examiner

*Primary Examiner* — Ahmed A Berhan
(74) *Attorney, Agent, or Firm* — ScienBiziP, P.C.

(57) ABSTRACT

A camera module includes a circuit board, an image sensor, a bracket, a VCM, and a lens module. The image sensor is positioned on the circuit board. The bracket is mounted on the circuit board and receives the image sensor. The VCM is mounted on the bracket and includes a conductive housing and pins extending from the housing. The pins are electrically connected to the circuit board. The lens module is received in the VCM. The VCM with the lens module is supported on the bracket. The optical axis of the lens module is coinciding with a center of the image sensor. The bracket includes a plating layer and solder bumps. The plating layer is formed at least one of side surfaces of the bracket. The solder bumps electrically connect the plating layer to the circuit board and electrically connect the plating layer to the housing.

13 Claims, 3 Drawing Sheets

CAMERA MODULE WITH ELECTRO-MAGNETIC INTERFERENCE SHIELDING

FIELD

The subject matter herein generally relates to optical imaging technologies and, particularly, to a camera module with electro-magnetic interference (EMI) shielding.

BACKGROUND

Many electronic devices including mobile phones are increasingly diversified in function, and many models are now available with built-in cameras. It is desirable that a main body of the camera is enclosed by a shielded housing for reducing the electromagnetic wave generated by terminals of the camera modules when transmitting signals or shielding the terminals from external electromagnetic interference (EMI).

BRIEF DESCRIPTION OF THE DRAWINGS

Implementations of the present technology will now be described, by way of example only, with reference to the attached figures.

DETAILED DESCRIPTION

Figure 1:
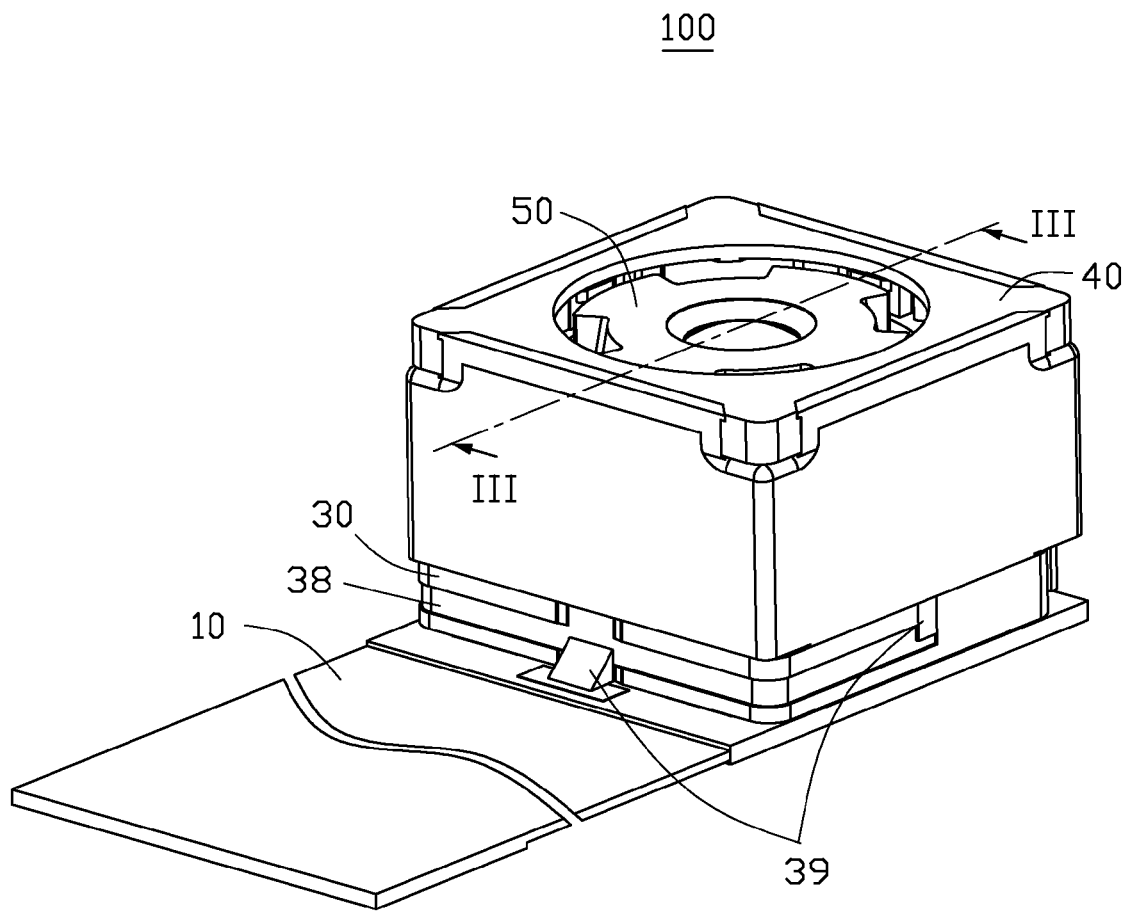
FIG. 1 is an isometric view of an exemplary embodiment of a camera module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to mean essentially conforming to the particular dimension, shape, or other feature that is modified such that exactness does not apply. For example, substantially rectangular means that the object resembles a rectangle, but can have one or more deviations from a true rectangle. The term "comprising," means "including, but not necessarily limited to" and specifically indicates open-ended inclusion or membership in the so-described combination, group, series and the like.

The present disclosure is described in relation to a camera module. A camera module includes a circuit board, an image sensor, a bracket, a VCM, and a lens module. The image sensor is positioned on the circuit board. The bracket is mounted on the circuit board and receives the image sensor. The VCM is mounted on the bracket and includes a conductive housing and pins extending from the housing. The pins are electrically connected to the circuit board. The lens module is received in the VCM. The VCM with the lens module is supported on the bracket. The optical axis of the lens module is coinciding with a center of the image sensor. The bracket includes a plating layer and solder bumps. The plating layer is formed on at least one of side surfaces of the bracket. The solder bumps electrically connect the plating layer to the circuit board and electrically connect the plating layer to the housing.

Figure 2:
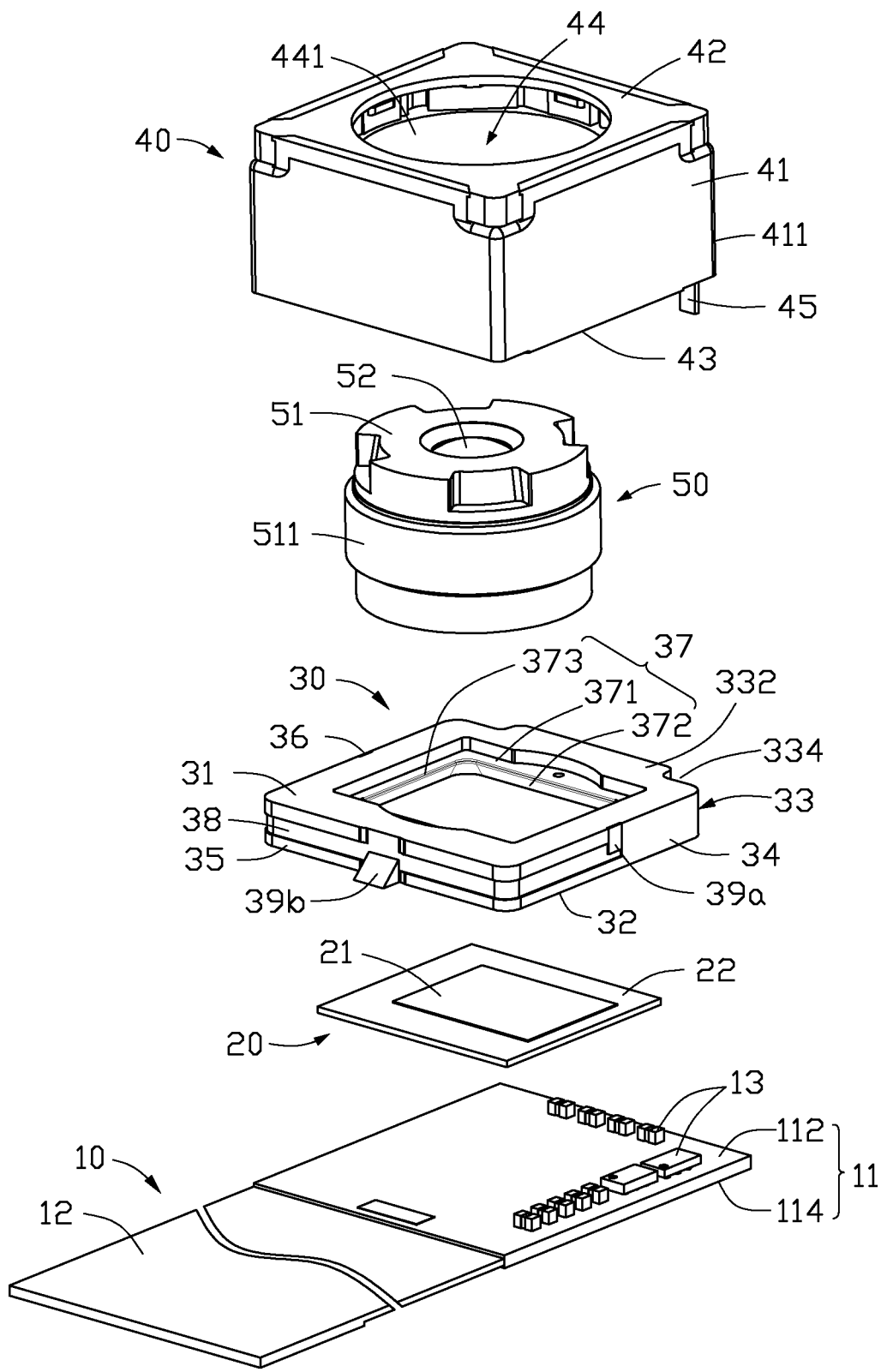
FIG. 2 is an exploded view of the camera module of FIG. 1.
Figure 3:
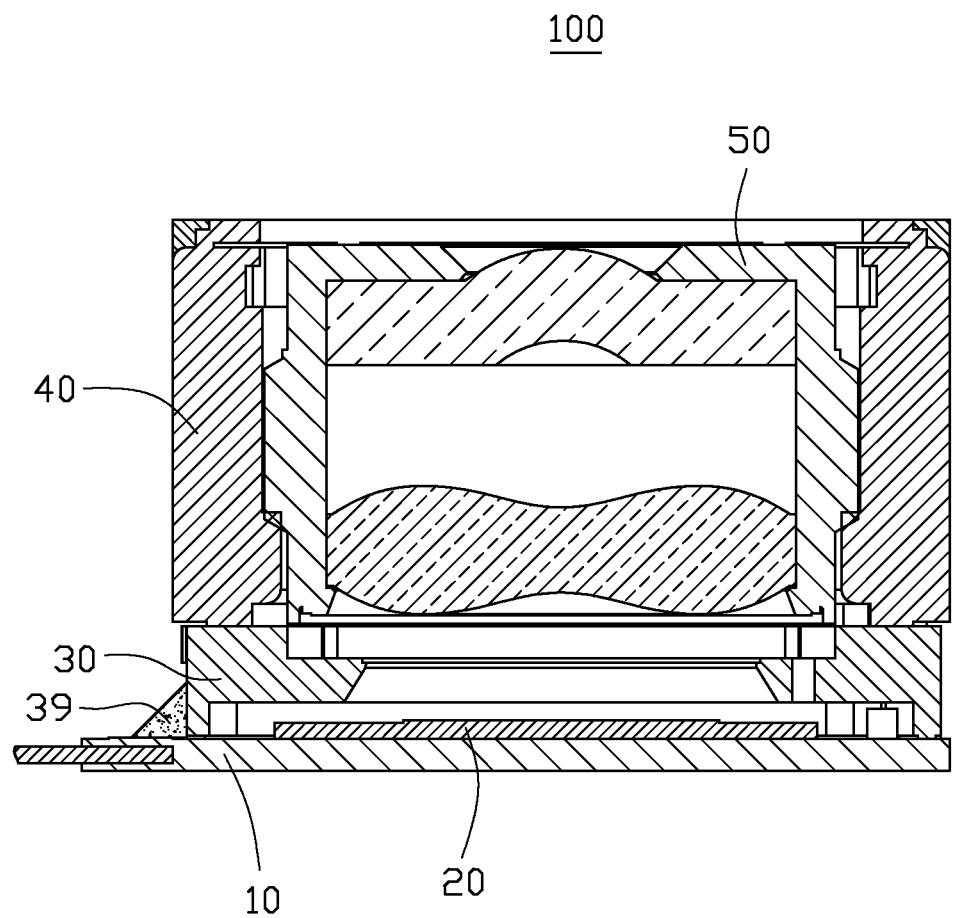
FIG. 3 is a cross sectional view of the camera module of FIG. 1, taken along line III-III.

FIGS. 1, 2, and 3 illustrate an exemplary embodiment of a camera module 100. The camera module 100 includes a circuit board 10, an image sensor 20, a bracket 30, voice-coil motor (VCM) 40, and a lens module 50.

The circuit board 10 includes a support portion 11 and a connection portion 12 electrically and mechanically connected to a side of the support portion 11. The support portion 11 includes a first surface 112 and a second surface 114. The first surface 112 and the second surface 114 are positioned at opposite sides of the support portion 11. A number of electrical elements 13 are attached on the supporting surface 112. The connection portion 12 is configured to connect the support portion 11 with other electronic components (not shown). In the present embodiment, the circuit board 10 is a rigid-flexible printed circuit board. The support portion 11 is a rigid board, and the connection portion 12 is a flexible board. The connection portion 12 can bend more than 90 degrees relative to the support portion 11. In other embodiments, the circuit board 10 can be a flexible printed circuit board. In this instance, a stiffening plate is mounted on the flexible printed circuit board.

The image sensor 20 is mounted on the supporting surface 112, and includes an sensing area 21 and a non-sensing area 22 surrounding the sensing area 21. In the present embodiment, the image sensor 20 is fixed on the supporting surface 112 with thermosetting adhesive. In other embodiments, the image sensor 20 can be soldered on the supporting surface 112. The image sensor 20 is configured to convert optical signals into electrical signals, and can be a charge coupled device (CCD) or a complementary metal oxide semiconductor (CMOS).

The bracket 30 is mounted on the supporting surface 112 and configured to support the VCM 40. The bracket 30 is substantially a cuboid, and includes a top surface 31, a bottom surface 32, a first side surface 33, a second side surface 34, a third side surface 35, and a fourth side surface 36. The top surface 31 and the bottom surface 32 are positioned at opposite sides of the bracket 30, and the bottom surface 32 is substantially parallel to the top surface 31. The first side surface 33 and the third side surface 35 are positioned at opposite sides of the bracket 30, and the first side surface 33 is substantially parallel to the third side surface 35. The second side surface 34 and the fourth side surface 36 are positioned at opposite sides of the bracket 30, and the second side surface 34 is substantially parallel to the fourth side surface 36. The first side surface 33, the second side surface 34, the third side surface 35, and the fourth side surface 36 are connected to each other end-to-end, and are substantially perpendicularly interconnected between the top surface 31 and the bottom surface 32.

A receiving hole 37 passing through the top surface 31 and the bottom surface 32 is defined in the bracket 30. The receiving hole 37 is substantially a rectangle. A ring-shaped plate 373 extends from an inner surface of the receiving hole 37, and divides the receiving hole 37 into an upper receiving hole portion 371 adjacent to the top surface 31 and a lower receiving hole portion 372 adjacent to the bottom surface 32. A filter (not shown) can be received in the upper receiving hole portion 371 and supported on the plate 373. The filter can filter infrared light or ultraviolet light. The dimension of the lower receiving hole portion 372 is larger than that of the upper receiving hole portion 371. The image sensor 20 and the electrical elements 13 are received in the lower receiving hole portion 372. The sensing area 21 can be entirely exposed at the plate 373.

A protrusion 332 protrudes from a middle portion of the first side surface 33, thereby two recess portions 334 are formed at opposite ends of the first side surface 33. The bracket 30 further includes a plating layer 38 and two solder bumps 39 (upper solder bump 39a and lower solder bump 39b). Portions of the bracket 30 except for the plating layer 38 and the solder bumps 39 are made of plastic. The plating layer 38 is formed on the second side surface 34 and the third side surface 35 by a laser direct structuring (LDS) method. In detail, the plating layer 38 includes a striped portion 382 formed on the second side surface 34 and a cross-shaped portion 384 formed on the third side surface 35. The striped portion 382 is connected to the cross-shaped portion 384. The upper solder bump 39a is located at an end of the striped portion 382. The lower solder bump 39b is located at the intersection line of the cross-shaped portion 384. The plating layer 38 is made of conductive metal, such as nickel (Ni), gold (Au), copper (Cu), or an alloy. In other embodiments, the plating layer 38 can be formed on one, two, three, or four of the first side surface 33, the second side surface 34, the third side surface 35, and the fourth side surface 36.

The VCM 40 is substantially a cuboid, and includes a conductive housing 41, upper end 42, and a lower end 43.

The housing 41 includes four sides 411 connected to each other, and extends from the upper end 42 to the lower end 43. In this embodiment, the housing 41 is made of magnetic shielding material, such as ferro-nickel, conductive plastic, or conductive glass. The housing 41 defines a through hole 44 passing through the upper end 42 and the lower end 43. Internal threads 441 are formed on an inner surface of the through hole 44. Two pins 45 extend from the housing 41 at the lower end 43 and correspond to the two recess portions 334. In this embodiment, the pins 45 are flat plates. In other embodiments, the pins 45 can be cylinders or cuboid, or other shapes.

The VCM 40 is mounted on the bracket 30. The lower end 43 is fixed on the top surface 31 with thermosetting adhesive. In this instance, the receiving hole 37 is aligned with the through hole 44. The pins 45 plug in the recess portions 334 and are electrically connected to the circuit board 10. The upper solder bump 39a electrically connects the housing 41 to the striped portion 382 of the plating layer 38, and the lower solder bump 39b electrically connects the circuit board 10 to the cross-shaped portion 384.

The lens module 50 is substantially a cylinder, and includes a lens barrel 51 and two optical lenses 52. External threads 511 are formed on an outer surface of the lens barrel 51 and correspond to the internal threads 441. The optical lenses 52 are respectively received in the opposite ends of the lens barrel 51. The external threads 511 engage with the internal threads 441, thereby the lens module 50 is received in the through hole 44. In this situation, the optical axes of the two optical lenses 52 are coinciding with the center of the sensing area 21. The VCM 40 includes coils (not shown) and magnets (not shown), and drives the lens module 50 to move along the optical axis of the lens module 50 (coinciding with the optical axes of the optical lenses 52) to achieve the auto-focus function.

The housing 41 can be electrically connected to a grounded structure of the circuit board 10 via the plating layer 38 and the solder bumps 39. The housing 41, the plating layer 38, the solder bumps 39, and the pins 45 form a conductive path, electromagnetic waves can be guided to the outside. In other words, the housing 41 can act as EMI shielding, and cooperate with the plating layer 38, the solder bumps 39, the pins 45, and the circuit board 10 to prevent external electromagnetic waves from affecting electrical signals of the VCM 40, and prevent electromagnetic waves of the VCM 40 from affecting electrical signals of the circuit board 10.

The embodiments shown and described above are only examples. Many details are often found in the art such as the other features of a camera module. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in the matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A camera module comprising: a circuit board; an image sensor positioned on the circuit board;
a bracket mounted on the circuit board and configured to receive the image sensor, the bracket comprises a plating layer and solder bumps, the plating layer formed on at least one side surface of the bracket, the solder bumps configured to electrically connect the plating layer to the circuit board and electrically connect the plating layer to the housing;
a voice-coil motor (VCM) mounted on the bracket, the VCM comprising a conductive housing and pins extending from the housing, the pins electrically connected to the circuit board;
a lens module received in the VCM, the lens module having an optical axis coincident with a center of the image sensor; and
wherein the bracket comprises a to surface, a bottom surface, and four side surfaces interconnected between the top surface and the bottom surface, the bottom surface is positioned on the circuit board, the top surface supports the VCM and the lens module.

2. The camera module of claim 1, wherein the circuit board is a rigid-flexible printed circuit board, and comprises a support portion and a connection portion electrically and mechanically connected to a side of the support portion, the support portion is a rigid board, and the connection portion is a flexible board.

3. The camera module of claim 1, wherein the circuit board is a flexible printed circuit board, and a stiffening plate is mounted on the flexible printed circuit board.

4. The camera module of claim 1, wherein the circuit board comprises a supporting surface, and the image sensor is fixed on the supporting surface with thermosetting adhesive.

5. The camera module of claim 1, wherein the circuit board comprises a supporting surface, and the image sensor is soldered on the supporting surface.

6. The camera module of claim 1, wherein a receiving hole passing through the top surface and the bottom surface is defined in the bracket, a ring-shaped plate extends from an inner surface of the receiving hole and divides the receiving hole into an upper receiving hole portion adjacent to the top surface and a lower receiving hole portion adjacent to the bottom surface, and the image sensor is received in the lower receiving hole portion.

7. The camera module of claim 6, wherein a dimension of the lower receiving hole portion is larger than that of the upper receiving hole portion.

8. The camera module of claim 6, wherein the image sensor comprises a sensing area and a non-sensing area surrounding the sensing area, and the sensing area is entire exposed at the plate.

9. The camera module of claim 6, wherein the four side surfaces comprises a first side surface, a second side surface, a third side surface, and a fourth side surface connected to each other end-to-end, the plating layer comprises a striped portion formed on the second side surface and a cross-shaped portion formed on the third side surface.

10. The camera module of claim 9, wherein the solder bumps comprises an upper solder bump and a lower solder bump, the upper solder bump is located at an end of the striped portion, and the lower solder bump is located at the intersection line of the cross-shaped portion.

11. The camera module of claim 9, wherein a protrusion protrudes from a middle portion of the first side surface, two recess portions are formed at opposite ends of the first side surface, the pins plug in the recess portions and are electrically connected to the circuit board.

12. The camera module of claim 1, the plating layer is made of conductive metal, such as nickel (Ni), gold (Au), copper (Cu), or alloy.

13. The camera module of claim 1, portions of the bracket except for the plating layer and the solder bumps are made of plastic, and the plating layer is formed on side surface by a laser direct structuring (LDS) method.

* * * * *